US005768644A

United States Patent [19]
Tanabe

[11] Patent Number: 5,768,644
[45] Date of Patent: Jun. 16, 1998

[54] APPARATUS FOR PREVENTING MIRROR BOUNCE IN CAMERA

[75] Inventor: Yoshiaki Tanabe, Yokohama, Japan

[73] Assignee: Nikon Corporation, Tokyo, Japan

[21] Appl. No.: 634,128

[22] Filed: Apr. 19, 1996

Related U.S. Application Data

[63] Continuation of Ser. No. 274,431, Jul. 13, 1994, abandoned.

[30] Foreign Application Priority Data

| Jul. 16, 1993 | [JP] | Japan | 5-199117 |
| Dec. 30, 1993 | [JP] | Japan | 5-354435 |
| Mar. 18, 1994 | [JP] | Japan | 6-481444 |

[51] Int. Cl.$^6$ ............................................ G03B 19/12
[52] U.S. Cl. ................................... 396/358; 396/447
[58] Field of Search .................................. 354/152, 250, 354/252, 256, 259; 396/447, 358

[56] References Cited

U.S. PATENT DOCUMENTS

| 1,009,521 | 11/1911 | Hunt et al. |
| 3,209,666 | 10/1965 | Kiper |
| 4,264,170 | 4/1981 | Kurei |
| 4,730,200 | 3/1988 | Kitazawa |
| 5,294,952 | 3/1994 | Misawa |

Primary Examiner—David M. Gray

[57] ABSTRACT

An apparatus for preventing mirror bounce in a camera includes a mirror member rotatable in reciprocation between a viewing position and a photographing position. A mirror receiving member receives a kinetic energy of the mirror member by making a predetermined motion when a collision of the mirror member takes place and, at the same time, position-regulates the mirror member in the viewing position. A moment of inertia of the mirror receiving member and/or the mirror member is set so that a bounce time after the collision of the mirror member is shorter by 15% or above than a bounce time when fixing the mirror receiving member.

31 Claims, 12 Drawing Sheets

APPARATUS FOR PREVENTING MIRROR BOUNCE IN CAMERA

This application is a continuation of application Ser. No. 08/274,431, filed Jul. 13, 1994, now abandoned.

BACKGROUND OF THE INVENTION

1. Field of the Invention

The present invention relates to a camera-mirror bounce preventing apparatus for preventing a bounce of a mirror incorporated into a camera.

2. Related Background Art

This type of conventional apparatus is constructed as shown in FIG. 1. Referring to FIG. 1, an unillustrated main mirror having a half-transmission portion is fixed to a main mirror holding frame 1. A support member 2 is integral with the main mirror holding frame 1. Fixed to the support member 2 are shafts 3, 4 and a pin 5. The shaft 3 is axially rotatably supported on an unillustrated camera body. A submirror 6 is fixed to a submirror holding frame 7. A submirror support member 8 is integral with the submirror holding frame 7. The submirror support member 8 is so axially supported on the shaft 4 as to be rotatable about the shaft 4. A pin 9 is fixed to the submirror support member 8. A toggle spring 10 is stretched between this pin 9 and the pin 5.

Shafts 11, 12 and pins 13, 14, 15 are fixed to the unillustrated camera body. An eccentric pin 16 is attached to the unillustrated camera body in such a way that a rotation of the eccentric pin 16 is adjustable. A main mirror receiving member 17 is so attached to the shaft 12 as to be rotatable about the shaft 12. The main mirror receiving member 17 has arms 17a, 17b, a bent portion 17c and a frictional surface 17d. The arm 17a contacts the eccentric pin 16. One end of a spring 18 is secured to a front edge of the arm 17b. The bent portion 17c contacts the main mirror holding frame 1. A brake lever 19 is so attached to the shaft 11 as to be rotatable about the shaft 11 and has a contact surface 19a. The other end of the spring 18 is secured to the brake lever 19. The spring 18 biases the main mirror receiving member counterclockwise about the shaft 12. The spring 18 also biases the brake lever 19 counterclockwise about the shaft 11. The arm 17a is pushed against the eccentric pin 16 by the biasing force of the spring 18. The contact surface 19a is also pushed against the frictional surface 17d by the biasing force thereof. One end of a mirror return spring 20 is fixed to the support member 2, while the other end thereof is fixed to the unillustrated camera body. This mirror return spring 20 biases the main mirror holding frame 1 counterclockwise about a bearing (not shown) of the shaft 3. Herein, the spring 18 exhibits a stronger biasing force than that of the mirror return spring 20.

Next, the operation of the prior art will be explained. When completing an exposure by a known method, the main mirror holding frame 1 is rotationally returned counterclockwise about the shaft 3 by the biasing force of the mirror return spring 20. Then, the main mirror holding frame and the bent portion 17c collide with each other. The main mirror receiving member 17 is rotated by this collision force, resisting the spring 18. On the other hand, the main mirror holding frame 1 continues to rotate counterclockwise and collides with the pin 15. Hereupon, the main mirror holding frame 1 largely bounces clockwise, resisting the mirror return spring 20. The submirror 6 makes a motion following up this bounce.

According to the above-mentioned prior art, one of light beams S1 coming via a lens is reflected by the main mirror and turns out to be a light beam S2 traveling toward a finder. The other light beam penetrating the half-transmitting portion of the main mirror is reflected by the submirror 6 and becomes a light beam S3 traveling toward a light metering/focus detecting element 21. When the main mirror holding frame 1 collides with the pin 15 and thereby bounces largely clockwise, the submirror 6 makes the motion following up this bounce. Consequently, a direction of the light beam S3 traveling toward the light metering/focus detecting element 21 is changed. If a light metering/focus detecting operation is performed during this bounce, it follows that errors are caused in a light metering value and a focus detecting value as well. Under such circumstances, a start of the light metering/focus detecting operation has to be delayed till the bounce disappears (till a standby time is elapsed) in the prior art, this presents an obstacle to increasing the number of photographing films per unit time in continuous photography while tracking an object by autofocusing.

SUMMARY OF THE INVENTION

The present invention devised in view of the problems given above, aims at speeding up a start of a light metering/focus detecting process by reducing a bounce time after a mirror-down and thereby increasing the number of photographing films per unit time in a continuous photography while tracking an object by autofocusing.

To accomplish this object, according to one embodiment of the present invention, there is provided an apparatus for preventing mirror bounce in a camera, comprising: a mirror member rotatable in reciprocation between a viewing position and a photographing position; and a mirror receiving member for receiving a kinetic energy of the mirror member by making a rotational motion when a collision of the mirror member takes place and, at the same time, position-regulating the mirror member at a predetermined angle of rotation. A moment of inertia of the mirror receiving member and/or the mirror member is determined so that a bounce time for which the mirror member collides with the mirror receiving member and bounces is shorter by 15% or above than a bounce time when fixing the mirror receiving member.

In the thus constructed apparatus for preventing the mirror bounce in the camera, the moment of inertia of the mirror receiving member and/or the mirror member is determined so that the bounce time for which the mirror member collides with the mirror receiving member and bounces is shorter by 15% or above than the bounce time when fixing the mirror receiving member. Therefore, the bounce time after the mirror-down can be reduced, which in turn speeds up the start of the light metering/focus detecting process. It is possible to increase the number of photographing films per unit time in continuous photography while tracking the object by autofocusing.

The present invention also aims at decreasing the number of parts and facilitating an assembly adjustment of the camera by eliminating the necessity for adjusting the moment of inertia and thereby reducing the costs.

To accomplish the above object, according to another embodiment of the present invention, there is provided an apparatus for preventing a mirror bounce in a camera, comprising: a mirror member rotatable in reciprocation between a viewing position and a photographing position; and a mirror receiving member for receiving kinetic energy of the mirror member by making a rotational motion when a collision of the mirror member takes place and, at the same time, position-regulating the mirror member in the viewing position. Each collided portion between the mirror member and the mirror receiving member takes a shape of involute curve.

Further, according to still another embodiment of the present invention, there is provided an apparatus for preventing mirror bounce in a camera, comprising: a mirror member rotatable in reciprocation between a viewing position and a photographing position; and a mirror receiving member for receiving kinetic energy of the mirror member by making a rotational motion when a collision of the mirror member takes place and, at the same time, position-regulating the mirror member in the viewing position. Each collided portion between the mirror member and the mirror receiving member takes a circular arc approximate to the involute curve.

According to a further embodiment of the present invention, there is provided an apparatus for preventing mirror bounce in a camera, comprising: a mirror member rotatable in reciprocation between a viewing position and a photographing position; a mirror receiving member for receiving a kinetic energy of the mirror member by making a rotational motion when a collision of the mirror member takes place and, at the same time, position-regulating the mirror member in the viewing position; and a damping member for damping a relative movement of the mirror receiving member with respect to a camera body. Each collided portion between the mirror member and the mirror receiving member takes a polygonal line approximate to the involute curve.

In the thus constructed apparatus for preventing mirror bounce in the camera, each collided portion between the mirror member and the mirror receiving member assumes the involute curve or the curve approximate thereto. Hence, even when adjusting the position of the mirror member, a common normal line at a collision point remains almost unchanged. Consequently, there is seen almost no change in terms of bounce preventive conditions. Accordingly, there is almost no error caused in the bounce preventive conditions even when adjusting the position of the mirror member. It is possible to omit a moment-of-inertia adjusting device for correcting this error and an adjusting operation as well.

The present invention further aims at obviating troublesomeness to manually operate the mirror for the adjustment and eliminating the necessity for a special adjusting device by adjusting the moment of inertia of the mirror bounce preventing apparatus even after assembling a front body and a rear body.

To accomplish the above object, according to a still further embodiment of the present invention, there is provided an apparatus for preventing mirror bounce in a camera, comprising: a mirror box; a mirror member provided in the mirror box and shiftable between a viewing position within a photographing optical path and a photographing position off the photographing optical path; a mirror receiving member, possible of colliding with the mirror member in the viewing position and so provided as to be rotatable about a predetermined central shaft of rotation, for receiving a kinetic energy of the mirror member when the mirror member shifts from the photographing position to the viewing position; and an adjusting member capable of adjusting the moment of inertial of the mirror receiving member with respect to the central shaft of rotation. The adjusting member is so disposed as to be capable of adjusting from an interior of the mirror box.

The apparatus is constructed so that the moment of inertia of the mirror bounce preventing apparatus can be adjusted from the interior of the mirror box after assembling the front and rear bodies. It is therefore possible to obviate the troublesomeness to manually operate the mirror in order to adjust the moment of inertia and, at the same time, eliminate the necessity for providing a special device for a mirror-up and a mirror-down.

Further, after assembling the front and rear bodies, the moment of inertia of the mirror bounce preventing apparatus can be adjusted. Accordingly, it is feasible to adjust the moment of inertia of the mirror bounce preventing apparatus, including a mechanical assembly error caused when assembling the bodies between a mirror mechanism of the front body, a mirror-up spring of the rear body and a charge mechanism. The accurate adjustment based on an actual use is attainable.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Embodiments of the present invention will hereinafter be discussed with reference to the drawings. In advance of this discussion, a principle of a bounce preventing apparatus will be explained with reference to FIG. 2.

Figure 2:
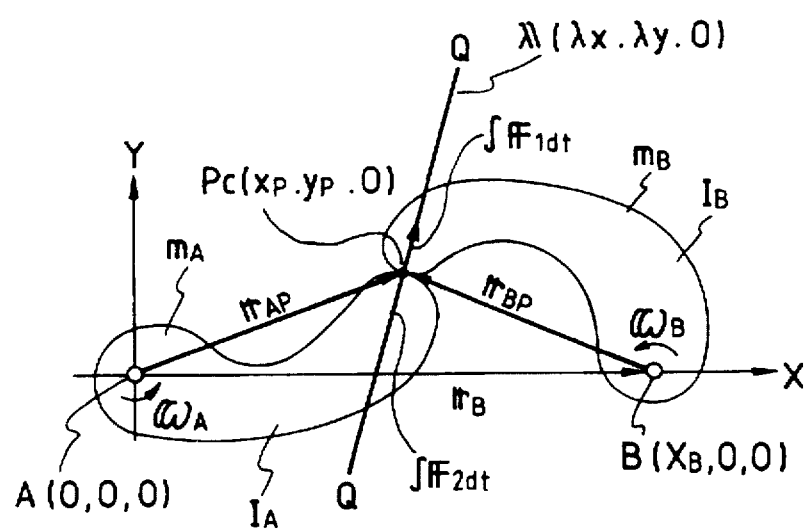
FIG. 2 is a conceptual view of assistance in explaining a principle of a camera-mirror bounce preventing apparatus according to the present invention.

Referring to FIG. 2, an object mA rotates about a shaft A at an angular speed vector $\omega A$. An object mB rotates about a shaft B at an angular speed vector $\omega B$. Now, it is assumed that an X-axis is taken in a direction toward the shaft B from the shaft A, and a Y-axis is taken in a direction orthogonal thereto, with the shaft A serving as an origin. Further, a Z-axis is taken in a direction perpendicular to the sheet surface of FIG. 2. A moment of inertia of the object mA is expressed by IA, while a moment of inertia of the object mB is expressed by IB. A line QQ is conceived as a common normal line at a point Pc when the object mA collides with the object mB at the point Pc. Further, a direction cosine of the line QQ is expressed by a vector $\lambda$. Let a vector $\int F2dt$ be an impulse acting on the object mA when collided, and let a vector $\int F1dt$ be an impulse acting on the object mB. Position vectors rAP, rBP, rB and respective components are taken as shown in FIG. 2.

The law of conservation of angular momentum is applied to the object mA.

$$IA\omega A + rAP \times \int F2dt = IA\omega A' \qquad (1)$$

where $\omega A'$ is the angular speed vector after the collision of the object mA.

The law of conservation of angular momentum is applied to the object mB.

$$IB\omega B + rBP \times \int F1dt = IB\omega B' \qquad (2)$$

where $\omega B'$ is the angular speed vector after the collision of the object mB.

Referring again to FIG. 2, the following relationship between the position vectors rAP, rBP, rB is established:

$$rBP = rAP - rB \qquad (3)$$

The action-reaction law is applied at the point Pc.

$$\int F1dt = -\int F2dt \qquad (4)$$

Let $(va)\lambda$ and $(vb)\lambda$ be the $\lambda$-directional components of speeds at the point Pc with respect to the objects mA, mB before being collided. Let $(va)\lambda'$ and $(vb)\lambda'$ be the $\lambda$-directional components of speeds at the point Pc with respect to the objects mA, mB after being collided. Then, a coefficient-of-restitution e is given by:

$$e = [(vb)\lambda' - (va)\lambda']/[(va)\lambda - (vb)\lambda] \qquad (5)$$

Herein, there are the following relationships:

$$(va)\lambda = (\omega A \times rAP) \cdot \lambda \qquad (6)$$

$$(vb)\lambda = (\omega B \times rBP) \cdot \lambda \qquad (7)$$

$$(va)\lambda' = (\omega A' \times rAP) \cdot \lambda \qquad (8)$$

$$(vb)\lambda' = (\omega B' \times rBP) \cdot \lambda \qquad (9)$$

Z-axis directional components $\omega AZ'$, $\omega BZ'$ of the angular speed vectors $\omega A'$, $\omega B'$ are hereinbelow given by use of these formulae (1) to (9).

$$\omega AZ' = \frac{[(1+e)C1C2IB\omega BZ + (C1^2IA - eC2^2IB)\omega AZ]}{C1^2IA + C2^2IB} \qquad (10)$$

$$\omega BZ' = \frac{[(1+e)C1C2IA\omega AZ + (C2^2IB - eC1^2IA)\omega BZ]}{C1^2IA + C2^2IB} \qquad (11)$$

Herein, however, the following formulae are given:

$$C1 = -yp\lambda x + (xp - xB)\lambda y \qquad (12)$$

$$C2 = -yp\lambda x + xp\lambda y \qquad (13)$$

It is assumed in the formula (10) that the object mB stops before the collision, and the object mA stops after the collision. At this time, $$\omega BZ = \omega AZ' = 0 \qquad (14)$$

Hence, $$C1^2IA = eC2^2IB \qquad (15)$$

Namely, if the formula (15) is established, it follows that the object mA making a motion before the collision stops due to the collision.

The object mA is conceived as a member on the side of the main mirror holding frame 1. The object mB is regarded as a member on the side of the main mirror receiving member 17. Based on this, if designed to substantially establish the formula (15), it can be understood that the bounce preventing apparatus is attained.

The embodiments of the present invention will hereinafter be described with reference to the drawings.

Figure 3:
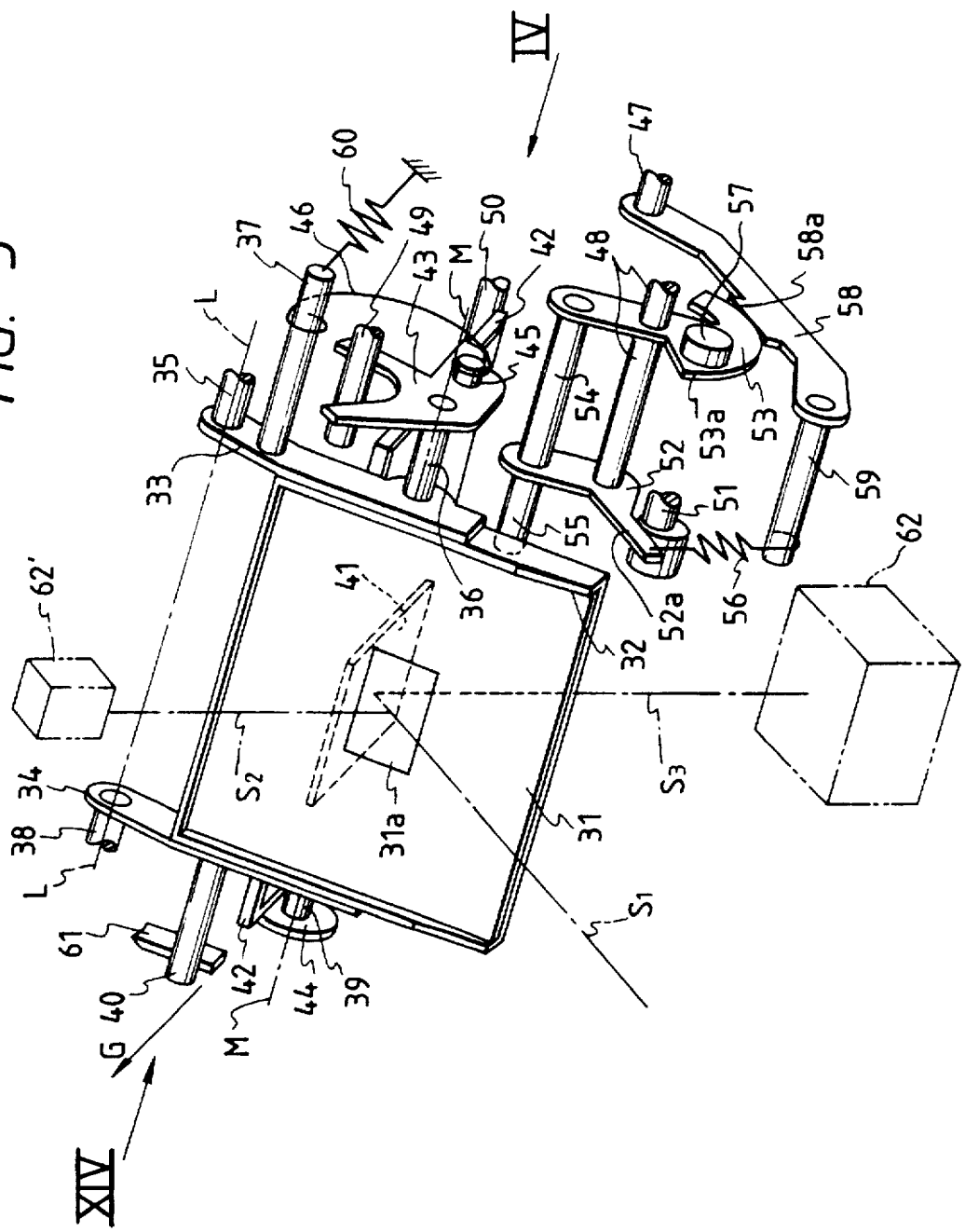
FIG. 3 is a perspective view illustrating a first embodiment of the camera-mirror bounce preventing apparatus of this invention.
Figure 4:
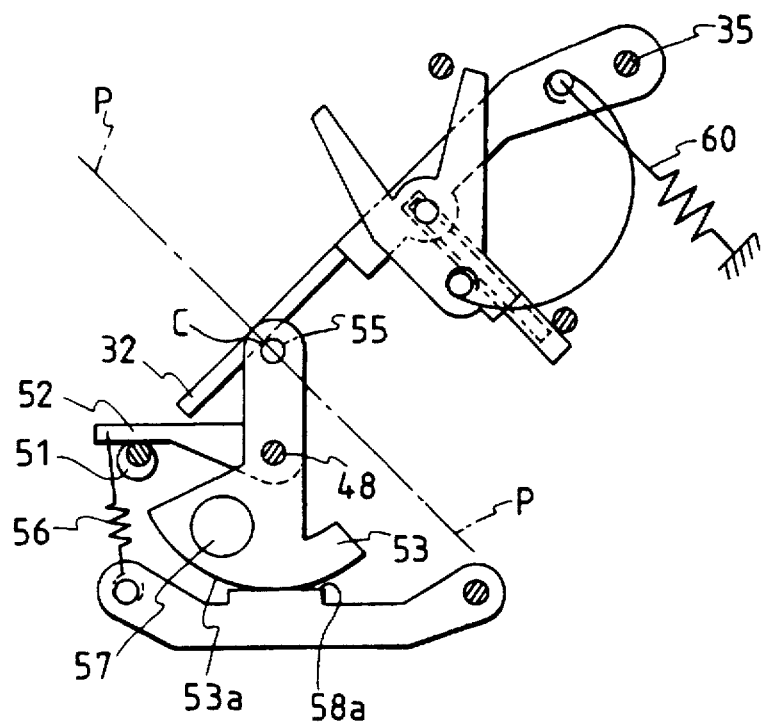
FIG. 4 is a side view illustrating the first embodiment of the camera-mirror bounce preventing apparatus of this invention.

FIG. 3 is a perspective view illustrating a first embodiment of the camera-mirror bounce preventing apparatus according to this invention. FIG. 4 is a side elevation of the apparatus of FIG. 3 as viewed in a direction IV.

Referring to FIG. 3, a main mirror 31 of a single-lens reflex camera is in such a position that the object is viewable through an unillustrated finder. The main mirror 31 has a half-transmission portion 31a but is fixed to a main mirror holding frame 32. Support members 33, 34 are integral with the main mirror holding frame 32. Shafts 35, 36 and a pin 37 are fixed to the support member 33. Shafts 38, 39 and a pin 40 are fixed to the support member 34. The shafts 35, 38 are axially rotatably supported on an unillustrated camera body. A line LL is the central line common to the shafts 35, 38. A submirror 41 is fixed to a submirror holding frame 42. Submirror support members 43, 44 are integral with the submirror holding frame 42. The submirror support member 43 is so axially supported on the shaft 36 as to be rotatable about the shaft 36. A pin 45 is fixed to the submirror support member 43. A toggle spring 46 is stretched between these pins 45 and 37.

A submirror support member 44 is so axially supported on a shaft 39 as to be rotatable about the shaft 39. A line MM is the central line common to the shafts 36, 39. Shafts 47, 48 and pins 49, 50 are fixed to the unillustrated camera body. An eccentric pin 51 is so attached to the unillustrated camera body as to be rotationally adjustable. Both of a main mirror receiving member 52 and an inertia lever 53 are so attached to the shaft 48 as to be rotatable thereabout. One ends of the main mirror receiving member 52 and the inertia lever 53 are connected through a pin 54 and therefore make motions together. An arm 52a of the main mirror receiving member 52 contacts the eccentric pin 51, and one end of a spring 56 is secured to the front edge thereof.

A pin 55 is fixed to the main mirror receiving member 52, and a front edge thereof is brought into contact with the main mirror holding frame 32. The inertia lever 53 has a frictional surface 53a assuming a shape of circular arc, and a weight 57 is secured to the inertia lever 53. A brake lever 58 is so attached to the shaft 47 as to be rotatable about the shaft 47. The brake lever 58 has a contact surface 58a, and a pin 59 is fixed to the front edge thereof. The other end of the spring 56 is caught by this pin 59. The spring 56 biases the main mirror receiving member 52 counterclockwise about the shaft 48. The spring also biases the brake lever 58 clockwise about the shaft 47. With this biasing force, the arm 52a is pushed against the eccentric pin 51, and the contact surface 58a is pushed against the frictional surface 53a. One end of a mirror return spring 60 is fixed to the pin 37, and the other end thereof is fixed to the unillustrated camera body. This mirror return spring 60 biases the main mirror 31 counterclockwise about the shafts 35, 38. The main mirror holding frame 32 is pushed against the pin 55 by this biasing force.

The spring 56 has a stronger biasing force than that of the mirror return spring 60. A drive lever 61 is secured to the unillustrated camera body. The pin 40 exists within a kinetic locus of the drive lever 61.

Next, the operation of the present invention will be explained.

Figure 5:
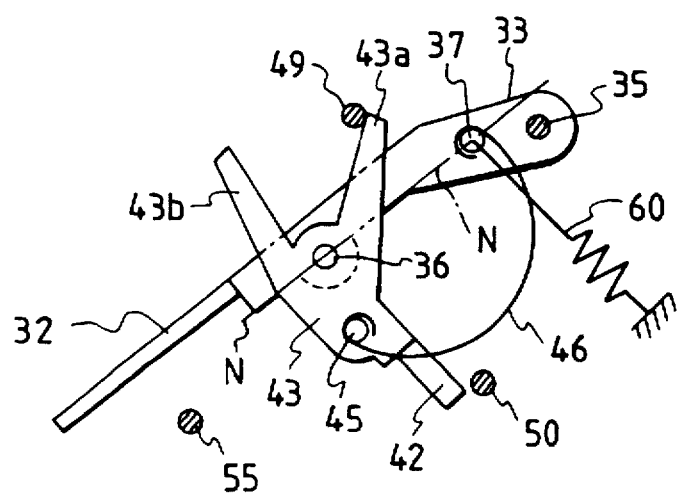
FIG. 5 is a side view illustrating the first embodiment of the camera-mirror bounce preventing apparatus of this invention.
Figure 6:
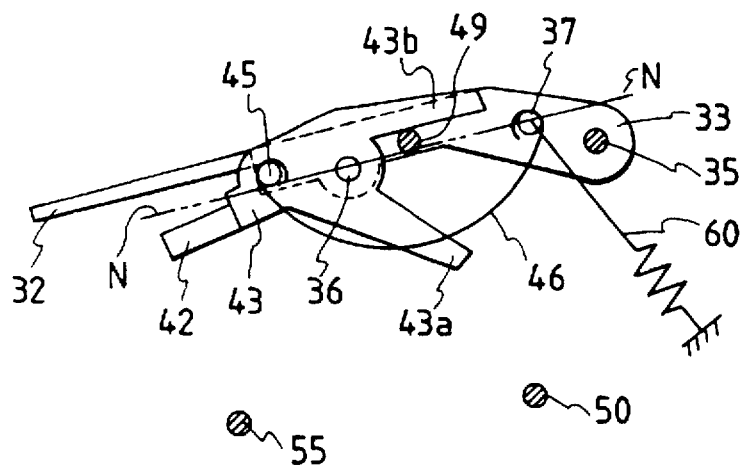
FIG. 6 is a side view illustrating the first embodiment of the camera-mirror bounce preventing apparatus of this invention.

When depressing an unillustrated release button, the drive lever 61 moves in a direction G in the Figure and engages with the pin 40, thereby raising the main mirror 31. At this time, the main mirror 31 rotates clockwise about the shafts 35, 38, resisting the mirror return spring 60. Eventually, as shown in FIG. 5, when the submirror holding frame 42 and the pin 50 are brought into a non-contact state, the mirror support member 43 rotates counterclockwise about the shaft 36 by the biasing force of the toggle spring 46, whereby the arm 43a of the mirror support member 43 and the pin 49 come into the contract state. Further, when the main mirror 31 rises, as illustrated in FIG. 6, the pin 45 comes to the side opposite to FIG. 5 with respect to the line NN which connects the center of the shaft 36 to the center of the pin 37.

Figure 7:
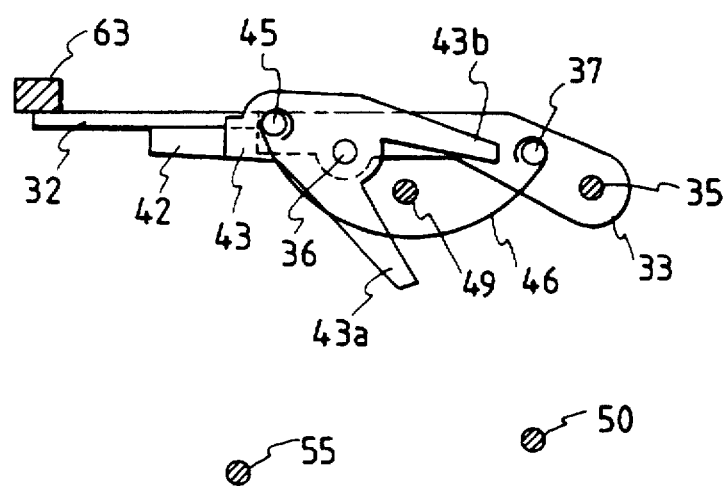
FIG. 7 is a side view illustrating the first embodiment of the camera-mirror bounce preventing apparatus of this invention.

Hereupon, the biasing force of the toggle spring 46 acts to rotate the mirror support member 43 clockwise about the shaft 36. With this action, the arm 43b of the mirror support member 43 comes to contact the pin 49 this time. Then, upon a completion of the mirror-up of the main mirror 31, as illustrated in FIG. 7, the main mirror 31 contacts a stopper 63 fixed to the camera body and thus stops. At this time, the submirror holding frame 42 and the main mirror holding frame 32 contact each other by the biasing force of the toggle spring 46, with the result that the half-transmission portion 31a is intercepted from the light. When the main mirror 31 comes to a photographing position and stops therein, an unillustrated shutter thus operates to perform an exposure. After a completion of the exposure, the drive lever 61 moves in the direction opposite to G of FIG. 3. Following up this motion, the main mirror 31 rotates counterclockwise about the shafts 35, 38 by the biasing force of the mirror return spring 60 and returns to the viewing position.

FIG. 4 depicts a moment when the pin 55 collides with the main mirror holding frame 32 with a descent of the main mirror 31. Herein, the weight 57 is secured to substantially establish the formula (15) between the member on the side of the main mirror and the member on the side of the main mirror receiving member. Accordingly, the member on the side of the main mirror almost stops after the collision, while the member on the side of the main mirror receiving member rotates clockwise about the shaft 48. The member on the side of the main mirror includes all the members (i.e., a member corresponding to the object mA in FIG. 2) making the motions when the main mirror 31 returns to the viewing position by the biasing force of the mirror return spring 60. Further, the member on the side of the main mirror receiving member includes all the members (viz., a member corresponding to the object mB in FIG. 2) making the motions with an impact force undergone by the pin 55 when collided.

A kinetic energy obtained by the member on the side of the main mirror receiving member with this collision is accumulated as a distortion energy of the spring 56 and, at the same time, dissipated by the frictional force between the contact surface 58a and the frictional surface 53a. Eventually, the member on the side of the main mirror receiving member stops the clockwise rotation and, in turn, starts rotating counterclockwise by the biasing force of the spring 56. Then, the pin 55 and the main mirror holding frame 32 make a second collision. At this time, however, the kinetic energy of the member on the side of the main mirror receiving member is sufficiently dissipated by the frictional force between the contact surface 58a and the frictional surface 53a. Consequently, the member on the side of the main mirror makes almost no bounce.

Figure 8:
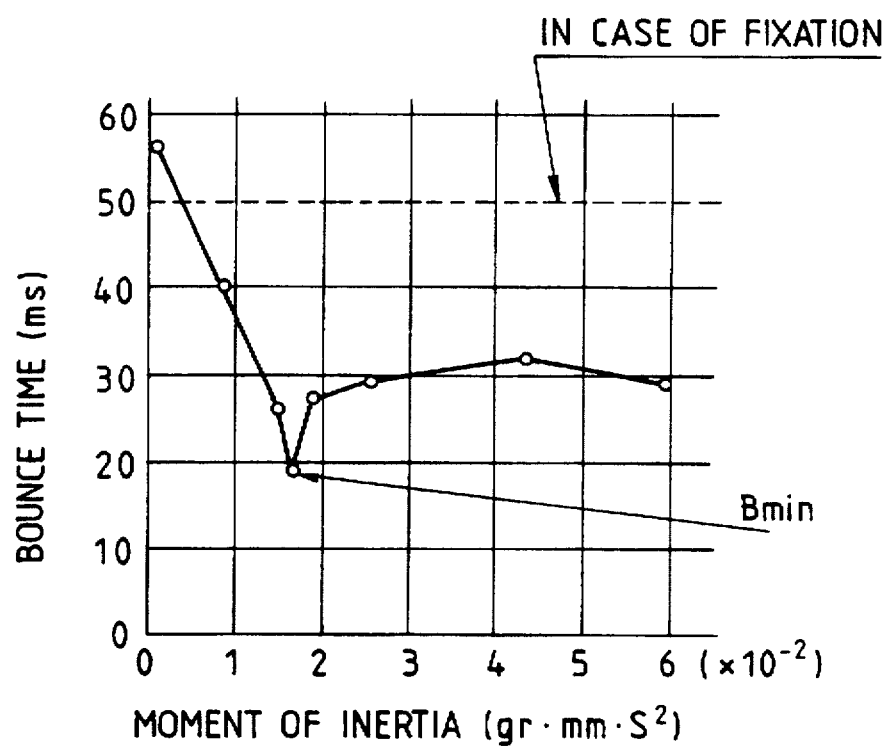
FIG. 8 is a characteristic diagram illustrating the first embodiment of the camera-mirror bounce preventing apparatus of this invention.

FIG. 8 shows one example of an empirical result in the actual camera. According to the experiment, among light beams S1 penetrating an unillustrated lens but shown in FIG. 3, variations in a light beam S3 traveling toward a light metering/focus detecting element 62 due to a bounce after a mirror-down are observed by use of the light metering/focus detecting element 62. When the bounce after the mirror-down disappears, the light beam S3 traveling toward the light metering/focus detecting element 62 is also stabilized. Hence, an output of the light metering/focus detecting element 62 is likewise stabilized. Now, a time till the output of the light metering/focus detecting element 62 becomes stable is conceived as a bounce time after the mirror-down and indicated by the axis of ordinates in FIG. 8. Further, the axis of abscissa indicates the moment of inertia of the member on the side of the main mirror receiving member. A case of fixation shown by a broken line in FIG. 8 expresses the bounce time when the member on the side of the main mirror receiving member is fixed to the camera body. On the occasion of the experiment, the light beam S3 is not necessarily measured. Instead, for instance, a light beam S2 reflected by the main mirror may be measured by a light metering/focus detecting element 62' provided on the side of the finder.

Figure 9:
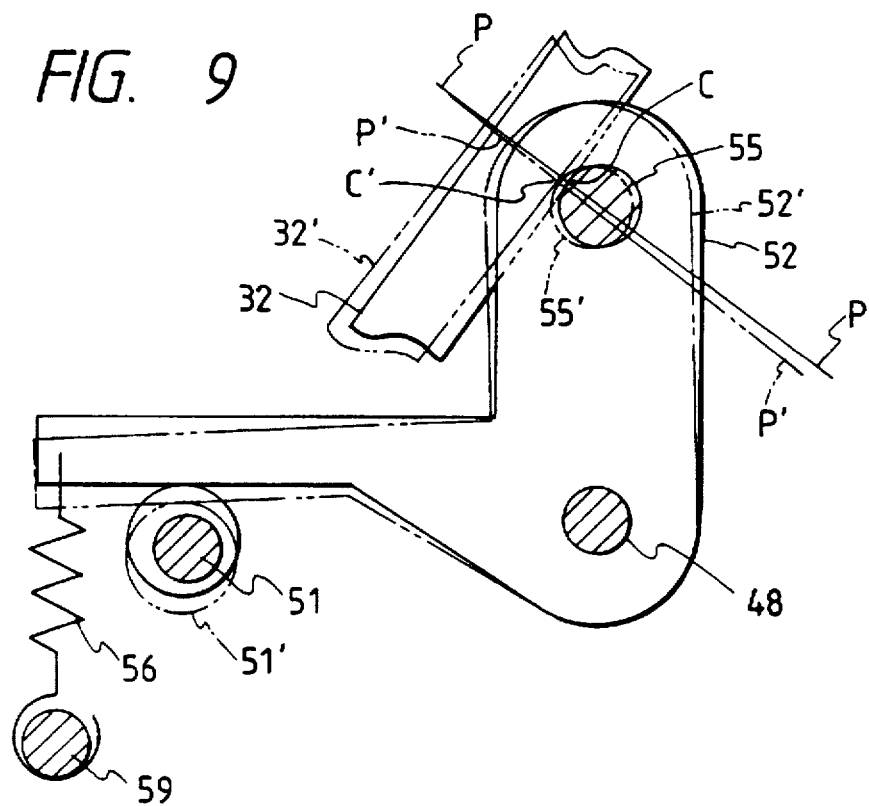
FIG. 9 is a side view illustrating the first embodiment of the camera-mirror bounce preventing apparatus of this invention.

FIG. 9 illustrates a method of adjusting the main mirror 31 in a position of 45°. Now supposing that the eccentric pin 51 rotates to a position 51', the main mirror receiving member 52 rotates counterclockwise about the shaft 48 by the biasing force of the spring 56 and comes to a position 52'. Hereupon, a collision point C shifts to a point C', while a common normal line PP at the collision point C becomes a line P'P'. This implies changes in terms of values of C1, C2 in the formulae (12) and (13). Then, it follows that the conditional expression (15) for the bounce prevention also changes. Further, the collision point C shifts to a point C', and, therefore, the coefficient-of-restitution e also changes. Moreover, it becomes obvious from the empirical result of FIG. 8 that there exists a minimum point (in the vicinity of a point Bmin) at which the bounce time is minimized.

Note that the submirror 41 or the like exists in the actual camera mirror, and it is therefore difficult to simply obtain a value of the moment-of-inertia IA in the principle formula

(15) for preventing the bounce. Accordingly, the bounce time may be measured by changing the value of the moment-of-inertia IB in many ways as in the case of the above experiment, and a proper value of the moment-of-inertia IB may be obtained from the result thereof.

Figure 10A:
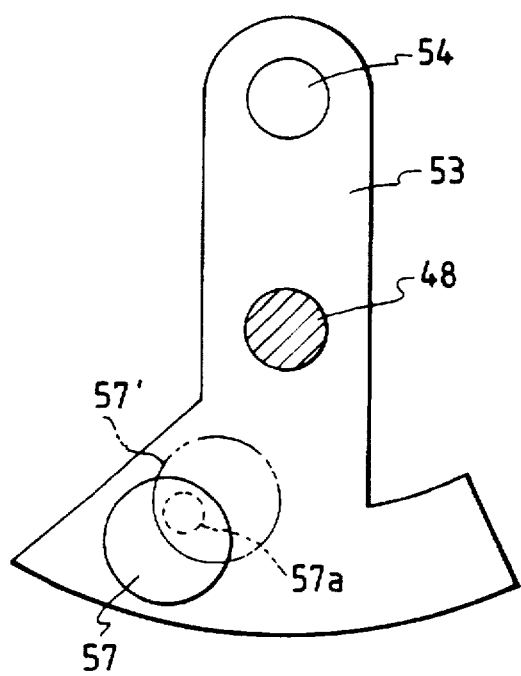
FIGS. 10A and 10B are a front view and a side view illustrating a second embodiment of the camera-mirror bounce preventing apparatus of this invention.
Figure 10B:
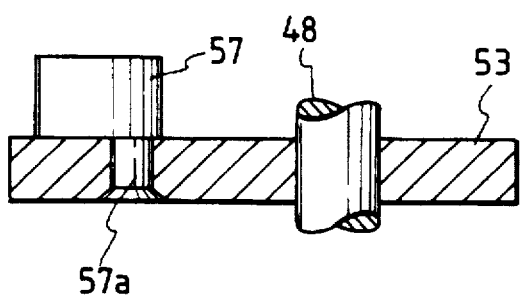

FIGS. 10A and 10B are front and side views illustrating a second embodiment of the camera-mirror bounce preventing apparatus according to this invention. FIGS. 10A and 10B also show an example wherein a distance between the weight 57 and the shaft 48 is adjustable. FIG. 10A is the front view of the apparatus as viewed in the direction IV of FIG. 3. FIG. 10B is the side view of FIG. 10A, wherein the inertia lever 53 is shown in section.

Referring to FIGS. 10A and 10B, the weight 57 has an eccentric shaft 57a. This eccentric shaft 57a is so caulked by the inertia lever 53 as to be rotationally adjustable. When the weight 57 rotates about the eccentric shaft 57a, the distance between the weight 57 and the shaft 48 can be adjusted as indicated by a two-dotted line in FIG. 10A.

Figure 11:
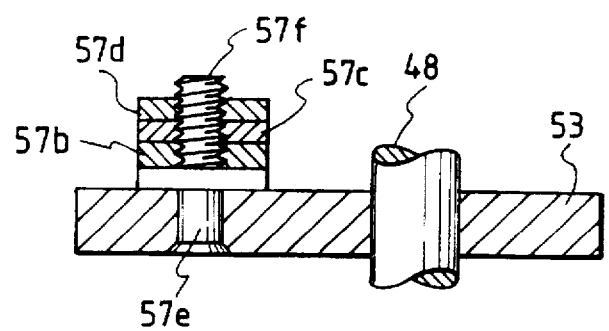
FIG. 11 is a side view illustrating a third embodiment of the camera-mirror bounce preventing apparatus of this invention.

FIG. 11 is a side view illustrating a third embodiment of the camera-mirror bounce preventing apparatus according to the present invention. Referring to FIG. 11, a screw shaft 57e is fixed to the inertia lever 53. Weights 57b, 57c, 57d are secured to a screw portion 57f thereof. If such a structure is taken, a mass can be adjusted depending on the number of the weights 57b, 57c, 57d.

Figure 12:
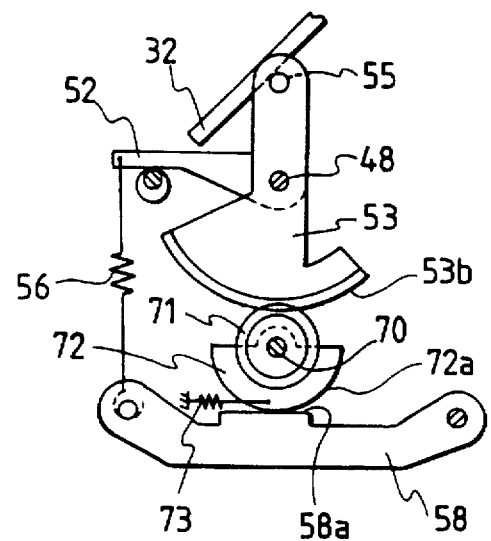
FIG. 12 is a front view illustrating a fourth embodiment of the camera-mirror bounce preventing apparatus of this invention.

FIG. 12 is a front view illustrating a fourth embodiment of the camera-mirror bounce preventing apparatus according to this invention.

Referring to FIG. 12, the inertia lever 53 is provided with a gear 53b. A gear 71 meshing with this gear 53b is rotatable about a shaft 70 fixed to the camera body. A friction plate 72 is formed integrally with the gear 71 but is rotatable about the shaft 70. A frictional surface 72a of the friction plate 72 is pushed against the contact surface 58a. One end of a spring 73 is secured to the friction plate 72, while the other end thereof is fixed to the camera body. This spring 73 biases the friction plate 72 clockwise about the shaft 70. This spring 73 works to prevent a backlash from being caused in a meshing portion when inertia lever 53 rotates clockwise. In the case of this construction, it follows that the gear 71 and the friction plate 72 rotate about the shaft 70 different from the rotary shaft 48 of the inertia lever 53 but, it can be regarded, constitute some of the moment-of-inertia IB of the object mB in FIG. 2. Accordingly, the moment-of-inertia IB is adjustable by changing a gear ratio between the gear 53b and the gear 71. The moment-of-inertia IB is also adjustable by changing a mass and a configuration of the friction plate 72.

Figure 13:
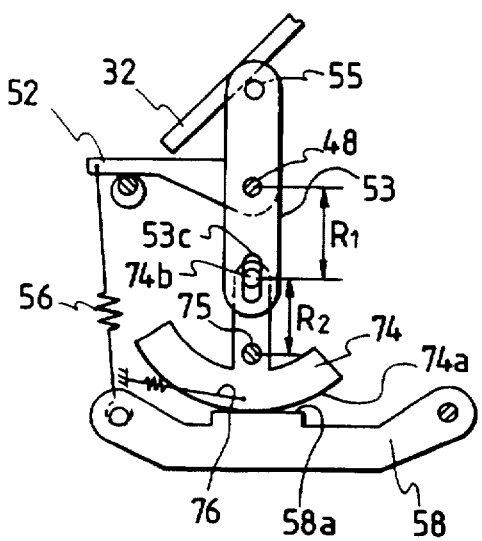
FIG. 13 is a front view illustrating a fifth embodiment of the camera-mirror bounce preventing apparatus of this invention.

FIG. 13 is a front view illustrating a fifth embodiment of the camera-mirror bounce preventing apparatus according to this invention.

Referring to FIG. 13, the inertia lever 53 is formed with an elongate hole 53c. A pin 74b sliding along this elongate hole 53c is fixed to a friction plate 74. The friction plate 74 is rotatable about a shaft 75 fixed to the camera body. A frictional surface 74a of the friction plate 74 is pushed against the contact surface 58a. One end of a spring 76 is secured to the friction plate 74, while the other end thereof is fixed to the camera body. This spring 76 biases the friction plate 74 clockwise about the shaft 75. This spring 76 works to prevent the backlash produced in a fitted portion between the pin and the elongate hole 53c when the inertia lever 53 rotates clockwise. In the case of this construction also, it follows that the friction plate 74 rotates about the shaft 75 different from the rotary shaft 48 of the inertia lever 53 but, it can be regarded, constitutes some of the moment-of-inertia IB of the object mB in FIG. 2. Hence, the moment-of-inertia IB can be adjusted by changing a lever ratio of R1:R2 between the friction plate 74 and the inertia lever 53. The moment-of-inertia IB can be also adjusted by changing a mass and a configuration of the friction plate 74.

Figure 14A:
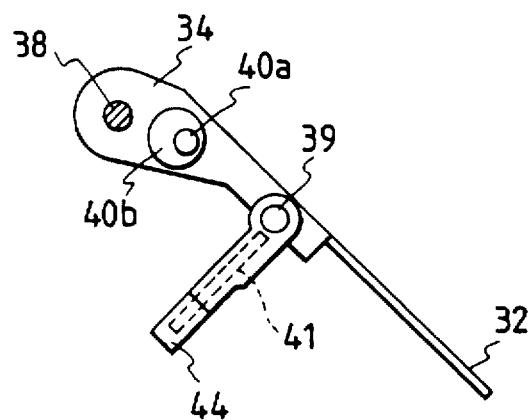
FIGS. 14A and 14B are a front view and a side view illustrating a sixth embodiment of the camera-mirror bounce preventing apparatus of this invention.
Figure 14B:
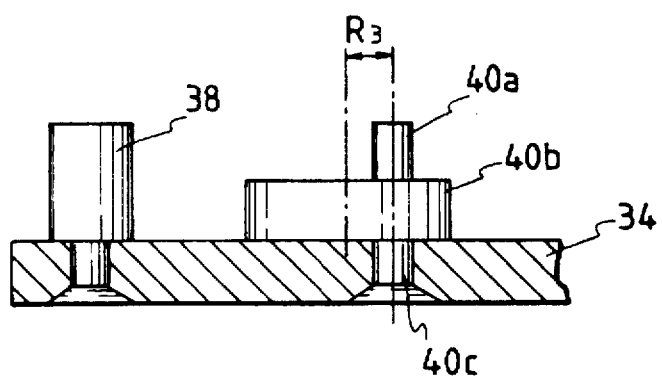

FIGS. 14A and 14B are front and side views illustrating a sixth embodiment of the camera-mirror bounce preventing apparatus according to this invention. A moment-of-inertia adjusting element as shown in FIGS. 10A and 10B is provided on the member on the side of the main mirror. FIG. 14A is the front view of the apparatus as viewed in a direction XIV of FIG. 3. FIG. 14B is the side view of FIG. 14A, wherein the support member 34 is shown in section.

Referring to FIGS. 14A and 14B, the pin 40 is constructed of an engagement portion 40a, a weight portion 40b and a shaft portion 40c. The engagement portion 40a is capable of engaging the drive lever 61. The shaft portion is rotatably caulked by the support member 34. The engagement portion 40a is coaxial with the shaft portion 40c, and only the weight portion 40b is eccentric by a spacing R3. Accordingly, as in the same way with the second embodiment, when the pin 40 rotates, the weight portion 40b changes in terms of relative position with respect to the shaft 38. This implies attaining the adjustment of the moment-of-inertia IA in the formula (15) as well as in FIG. 2.

In accordance with the embodiments discussed above, the bounce time after the mirror-down can be reduced, and, therefore, the start of the light metering/focus detecting operation can be speeded up. The number of photographing films per unit time can be thereby increased in continuous photography while tracking the object by autofocusing.

Further, the bounce time can be reduced in the case of continuous photography by manual focusing also. Hence, when making an attempt to perform continuous photography while the photographer focalizes by the manual focusing, the object is easy to see. Moreover, when an element for adjusting the moment of inertia is provided, and even if the bounce preventive conditions vary due to a 45° adjustment of the main mirror, this variation can be corrected. Still further, the bounce time can be so adjusted as to be minimized based on the empirical result.

As discussed above, according to the camera-mirror bounce preventing apparatus of this invention, the start of the light metering/focus detecting operation is speeded up by reducing the bounce time after the mirror-down. With this operation, it is possible to increase the number of photographing films per unit time in the continuous photography while tracking the object by autofocusing.

By the way, referring back to FIG. 4, when making the 45° adjustment of the main mirror 31 by fixing the eccentric pin 51, it follows that there also shifts the common normal line PP at the collision point C between the pin 55 and the main mirror holding frame 32. Then, the values of C1 and C2 shown in the formulae (12) and (13) also change, with the result that an error is produced in the conditional expression (15) for preventing the bounce. Under such circumstances, in the mirror bounce preventing apparatus for the single-lens reflex camera which is disclosed in the preceding embodiment, for example, the moment of inertia is adjusted by regulating a weight of the weight 57 in order to correct this error.

In the mirror bounce preventing apparatus for the single-lens reflex camera which is disclosed in the preceding embodiments, however, it follows that the position of the main mirror holding frame 32 is adjusted, and, subsequently, the moment of inertia is adjusted (the weight of the weight 57 is regulated) so as to maximize the bounce preventive effect (in the vicinity of the point Bmin in FIG. 8). Namely, this requires two adjusting processes, resulting in such a problem that the adjusting operation becomes complicated.

The following is an embodiment for obviating this problem.

The embodiment of this invention will hereinbelow be discussed with reference to the drawings. In advance of this discussion, a principle of the camera-mirror bounce preventing apparatus of the present invention will be explained with reference to FIG. 2.

Referring to FIG. 2, an equation of the common normal line QQ is obtained.

i) From a direction cosine λx, λy, an inclination of the straight line QQ is given by λy/λx.

ii) The point Pc (xp, yp) exists on the straight line QQ.

From the above-mentioned, the equation of the straight line QQ is given such as:

$$y=(\lambda y/\lambda x)x+yp-(\lambda y/\lambda x)xp \quad (100)$$

Herein, it is assumed that there is one arbitrary point P0 (x0, y0), the following equation is established:

$$y0=(\lambda y/\lambda x)x0+yp-(\lambda y/\lambda x)xp \quad (101)$$

When the collision point between the objects mA, mB shifts from Pc to P0, a value of the formula (12) is given by:

$$C01=-y0\lambda x+(x0-xB)\lambda y \quad (102)$$

The formula (101) is substituted into the formula (102) as follows:

$$\begin{aligned}
C01 &= -((\lambda y/\lambda x)x0 + yp - (\lambda y/\lambda x)xp)\lambda x + \\
&\quad (x0 - xB)\lambda y \\
&= -(\lambda y x0 + yp\lambda x - \lambda y xp) + (x0 - xB)\lambda y \\
&= -yp\lambda x + \lambda y xp - xB\lambda y \\
&= C1
\end{aligned}$$

Namely, the value of the formula (12) does not change.

Similarly, a value of the formula (13) is given such as:

$$C02=-y0\lambda x+x0\lambda y \quad (103)$$

However, as shown below, the value of the formula (13) still remains unchanged:

$$C02=C2$$

On the other hand, in involute gears, a contact point of a pair of teeth meshing with each other always exist on the line of action. The line of action is defined as a common normal line. Further, even when the contact point of the pair of teeth meshing with each other shifts, this line of action does not shift. Hence, this satisfies the conditions for keeping the values of C1, C2 unchanged. That is, even when the collision point shifts from Pc to P0, and if both of the collision points Pc, P0 exist on the line of action (common normal line) of the involute gears, the values of C1, C2 do not change. No error is also caused in the conditional expression (15), and, hence, it is feasible to eliminate the necessity for adjusting the moment of inertia.

Figure 15:
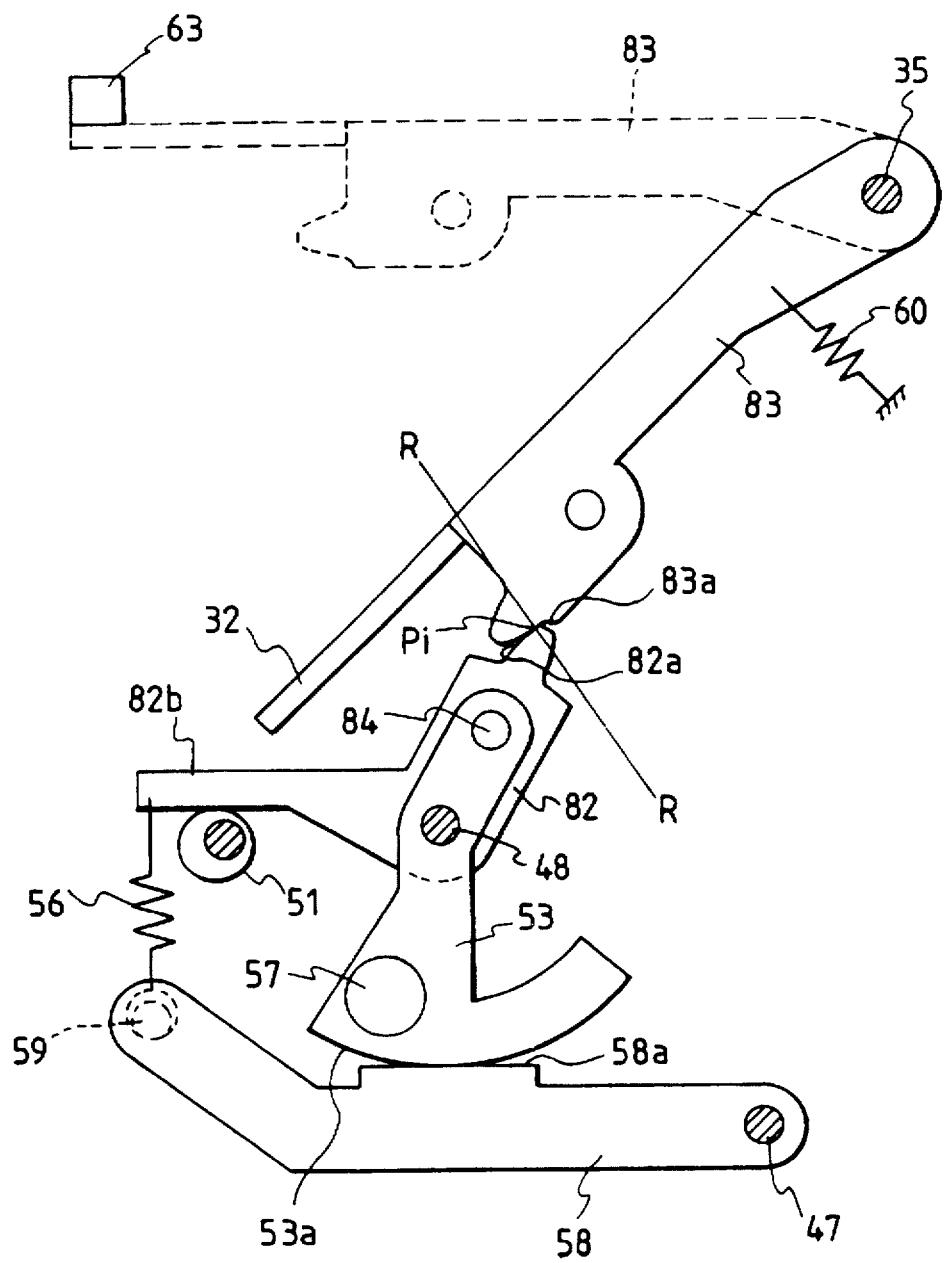
FIG. 15 is a side view showing a seventh embodiment of the camera-mirror bounce preventing apparatus of this invention.

FIG. 15 is a side view illustrating a seventh embodiment of the camera-mirror bounce preventing apparatus according to this invention. In FIG. 15, there is omitted an explanation of the same constructive members as those in the preceding embodiments.

Referring to FIG. 15, the shafts 35, 48, 47 and the stopper 63 are fixed to the unillustrated camera body. The eccentric pin 51 is rotatably attached to the unillustrated camera body. The mirror holding frame 32 is integral with a support member 83. The support member 83 is rotatable about the shaft 35 but is, on receiving a force of a spring 60, biased counterclockwise.

The support member 83 is formed with a tooth flank 83a of an involute gear rotating about the shaft 35. One end of the spring 60 is secured to the support member 83, while the other end thereof is secured to the unillustrated camera body. A main mirror 45° receiving member 82 is rotatable about the shaft 48 but is, on receiving a force of the spring 56, biased counterclockwise.

The main mirror 45° receiving member 82 is formed with a tooth flank of an involute gear rotating about the shaft 48. The tooth flank 82a meshes with the tooth flank 83a formed on the support member 83. A point Pi indicates a contact point between the tooth flank 83a and the tooth flank 82a. Further, a straight line PR passing through this point Pi is defined as a line of action (common normal line) of the tooth flanks 83a, 82a. Herein, the tooth flanks 82a, 83a are capable of meshing with each other, with their rotary shafts being the shaft 48 and the shaft 35, respectively. The tooth flanks 82a, 83a are tooth flanks of a pair of rotatable involute gears. The inertia lever 53 is rotatable about the shaft 48 and integral with the main mirror 45° receiving member 82 through a pin 84. The weight 57 is secured to the inertia lever 53. The brake lever 58 is rotatable about the shaft 47 but is, on receiving a force of the spring 56, biased clockwise.

One end of the spring 56 is secured to an arm 82b of the main mirror 45° receiving member 82, while the other end thereof is secured to the pin 59 fixed to the brake lever 58. The spring 56 exhibits a stronger biasing force than that of the spring 60. The arm 82b of the main mirror 45° receiving member 82 is pushed against the eccentric pin 51 by the biasing force of the spring 56. Further, the contact surface 58a of the brake lever 58 is pushed against the frictional surface 53a of the inertia lever 53 by the biasing force of the spring 56.

Subsequently, the operation of this invention will be explained.

When depressing the release button of the camera body, the support member 83 rotates clockwise resisting the spring 60 by a known method. Then, the support member 83 collides with the stopper 63 and hereupon stops. A state of the support member 83 at this time is shown by a broken line in FIG. 15.

Next, the unillustrated shutter operates, whereby the film is exposed. Thereafter, the support member 83 comes to rotate counterclockwise by the action of the spring 60. Eventually, the tooth flank 83a collides with the tooth flank 82a at the point Pi. Herein, if the weight 57 is properly set, as explained in the formula (15), the support member 83 makes almost no bounce but stops, thus preventing the bounce.

In accordance with the embodiments discussed above, the collision points between the mirror member and the main mirror 45° receiving member depicts an involute curve in terms of its configuration. Hence, a common normal line RR does not change even by adjusting the position of the mirror holding frame 32 through the eccentric pin 51. Consequently, the bounce preventive conditional expression (15) remains unchanged. For this reason, no error is produced in the bounce preventive conditions even by adjusting the position of the mirror holding frame 32. Omitted are the moment-of-inertia adjusting device for correcting this error and the adjusting operation as well. Accordingly, an assembly adjustment of the camera is facilitated, and it is possible to reduce both the number of parts and the costs.

In accordance with the embodiment, there has been given the explanation wherein the tooth flanks 83a, 82a serve as the tooth flanks of the involute gears. The tooth flank is not confined to this tooth flank but may be a tooth flank of a gear movable on such a line that the contact point Pi approximates the common normal line RR, e.g., a gear assuming a shape of polygonal line or circular arc.

As discussed above, according to the present invention, the collision portion between the mirror member and the mirror receiving member takes a configuration of an involute curve or curve approximate thereto. Hence, the common normal line of the collision portion does not substantially change even by adjusting the position of the mirror member. Consequently, the bounce preventive conditions remain unchanged. The error produced in the bounce preventive conditions is therefore very small even by adjusting the position of the mirror member, and, besides, there can be omitted the moment-of-inertia adjusting device for the error correction and the adjusting operation as well. It is also possible to reduce the number of parts and facilitate the assembly adjustment of the camera, thereby making an attempt to reduce the costs.

Figure 1:
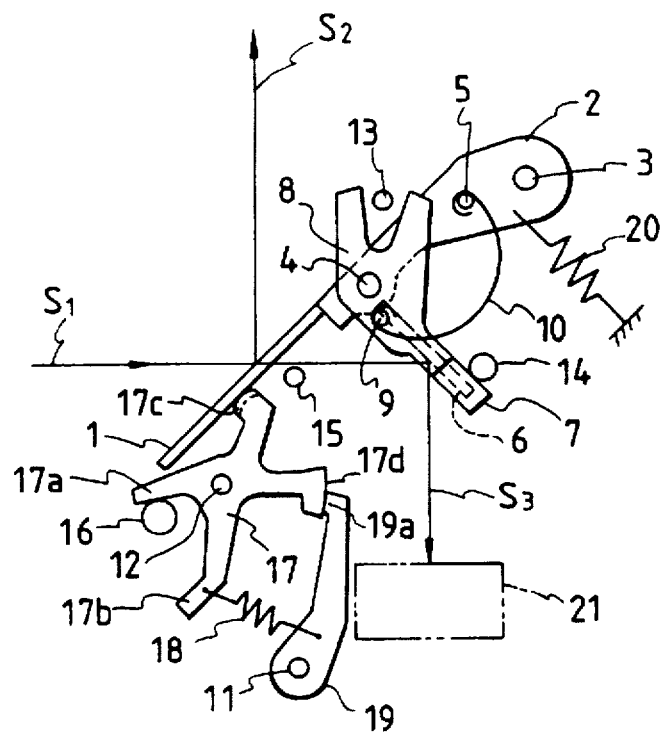
FIG. 1 is a side view illustrating one example of a conventional camera-mirror bounce preventing apparatus.

By the way, when the bounce preventing apparatus in the embodiments discussed above is installed in the conventional apparatus of FIG. 1, the standby time till the bounce disappears can be reduced. Then if this bounce preventing apparatus is so constructed as to be adjustable, it is possible to set the bounce preventing apparatus to efficiently damp the bounce.

Figure 16:
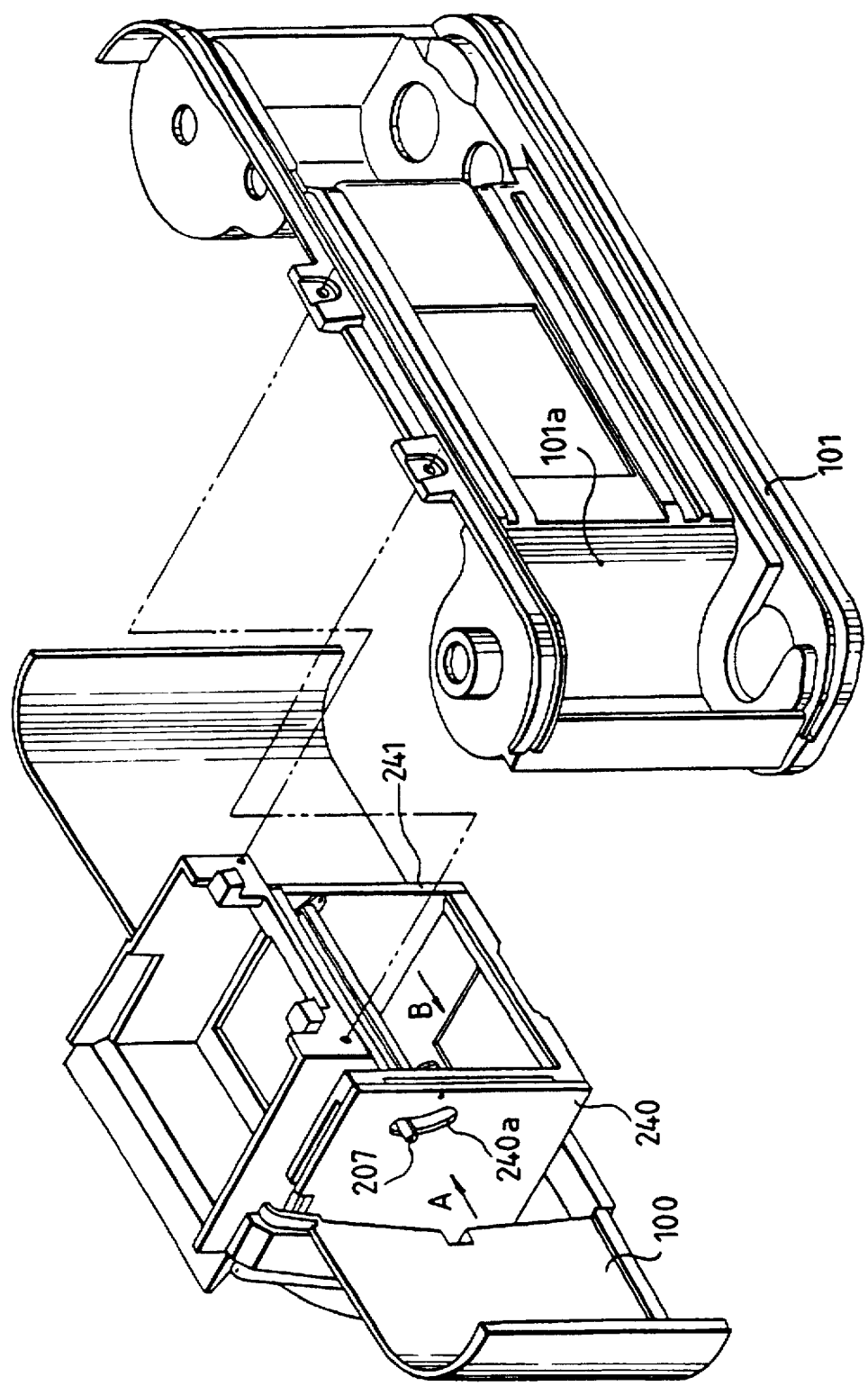
FIG. 16 is a fragmentary view showing a camera body decomposed into a front body and a rear body.

There arises, however, the following drawback inherent in such a construction that the conventional apparatus simply incorporates the bounce preventing apparatus in accordance with this embodiment. As shown in FIG. 16, a front body 100 and a rear body 101 are assembled (after assembling the camera body), and, thereafter, a Patrone chamber 101a of the rear body 101 becomes an obstacle even when adjusting the moment of inertia of the mirror bounce preventing apparatus in an arrowed direction A. For this reason, the conventional apparatus has to make the mirror 45° adjustment in the state of the front body 100 and the adjustment of the moment of inertia of the mirror bounce preventing apparatus, beforehand.

Mounted, by the way, in the rear body 101 is a mechanism (not shown) for charging a spring for raising (mirror-up) the mirror to a photographing position off the optical path from a viewing position and the spring (20 in FIG. 1) for, reversely, lowering (mirror-down) the mirror to the viewing position from the photographing position off the optical path. Further, even in such a camera that the mirror-up and mirror-down are effected by a motor (not illustrated), this mirror drive motor (not shown) is mounted in the rear body 101. A release device (unillustrated) for starting the mirror-up is also mounted in the rear body 101. Accordingly, if the mirror 45° positional adjustment and the moment-of-inertia adjustment of the bounce preventing apparatus are to be performed before assembling the front body 100 and the rear body 101, there exists a problem in which the mirror-up and mirror-down are effected manually, or alternatively there is required a new device for performing the mirror-up and mirror-down.

Further, when assembling the front body 100 and the rear body 101, there is caused a mechanical assembly error between the mirror mechanism provided in the front body 100, the mirror-up spring provided in the rear body 101 and the charge mechanism. For this reason, before assembling the front and rear bodies 100, 101, there arises a necessity for making a readjustment corresponding to the mechanical assembly error produced when assembled even by performing the mirror 45° adjustment and the moment-of-inertia adjustment.

The following is an embodiment for obviating the above problem.

Figure 17:
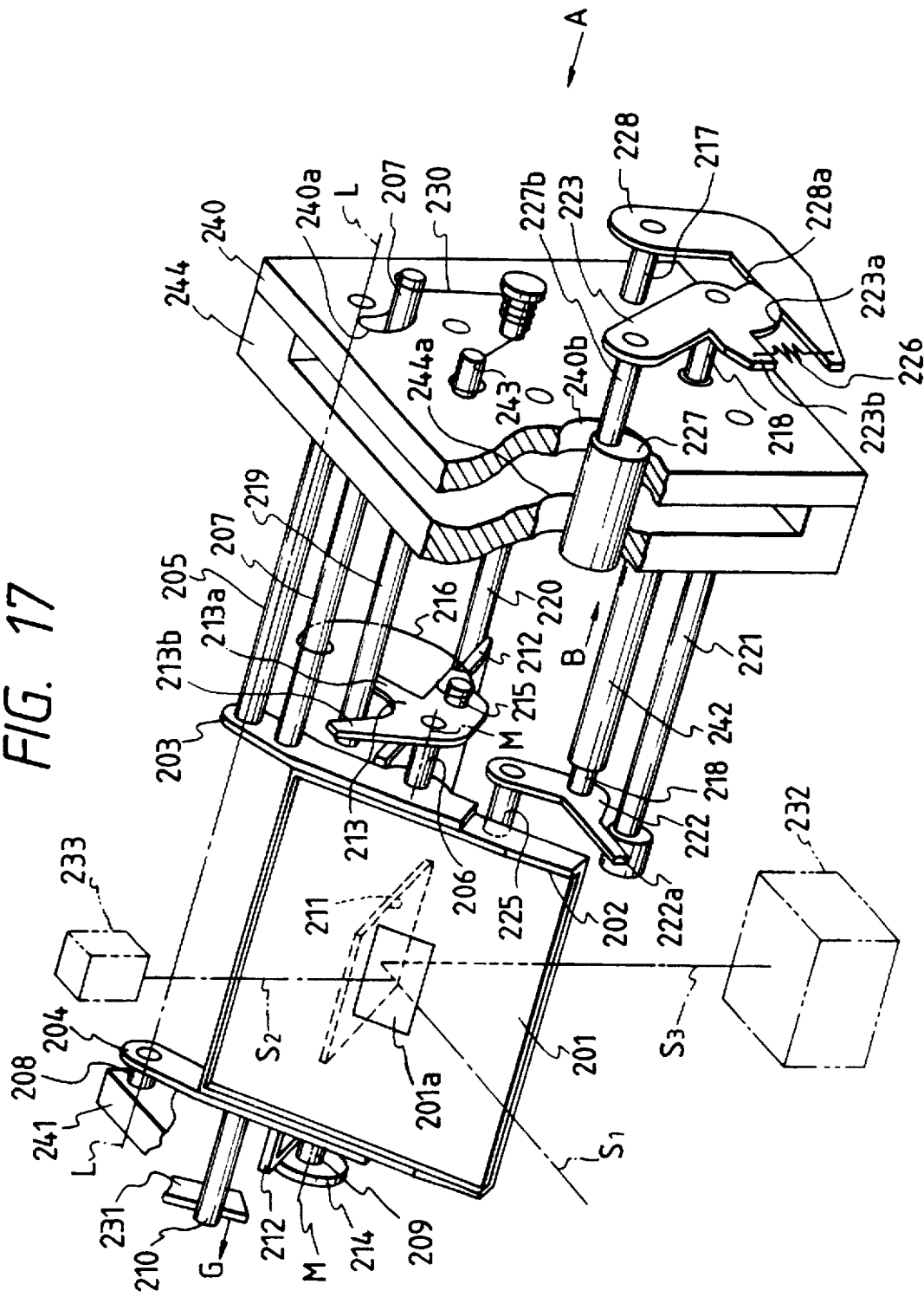
FIG. 17 is a perspective view illustrating an eighth embodiment of the mirror bounce preventing apparatus of this invention.

FIG. 17 illustrates an eighth embodiment of the present invention. The same members and the same directions as those in FIG. 16 are marked with the like symbols. Referring to FIG. 17, a main mirror 201 (a mirror member, a main mirror member, a first reflection member and a movable mirror) of the single-lens reflex camera is located in such a viewing position (a first position) as to be capable of viewing an object image (light of the object and light beams of the object) via the unillustrated finder. The main mirror 201 has a half-transmission portion 201a formed substantially at the central part thereof. The main mirror 201 is also fixedly held by a main mirror holding frame 202 (a mirror member and a holding member). Support members 203, 204 (mirror members) are provided integrally with the main mirror holding frame 202. Shafts 205, 206 and a pin 207 are fixed to the support member 203. Shafts 208, 209 and a pin 210 are fixed to the support member 204.

The shaft 205 penetrates a hole 244b (shown in FIG. 18) cut in a mirror box side wall 244 (a metallic or resinous dye-cast). The shaft 205 is then axially rotatably supported on a side surface substrate 240 (a substrate) composed of a metal (iron or the like). The side surface substrate 240 is provided on the mirror box side wall 244 on the opposite side to the main mirror 201. The side surface substrate 240 is fixed (fixedly provided) to the mirror box side wall 244 with unillustrated screws.

The mirror box side wall 244 (one side wall of the mirror box) is formed so that only a contact portion with the side surface substrate 240 (the substrate) is protruded on the side of the side surface substrate (a gap is formed between the side surface substrate and the mirror box side wall, excluding the contact portion with the side surface substrate 240). With this configuration, the mirror box side wall 244 takes an L-shape in section. The mirror box side wall 244 being formed in this way, the mirror box can be reduced in its weight, that is, it is possible to lighten the camera as a whole as well as to decrease the costs. Further, with respect to a surface accuracy of the mirror box side wall 244, the attention may be paid to only a surface accuracy of the contact portion with the side surface substrate 240. This brings about such an effect that a yield of the product is improved when manufactured.

A shaft 208 is axially rotatably supported on the side surface substrate 241. A line LL is the central line common to the shafts 205, 208.

A submirror 211 (a second reflection member and a submirror member) is fixed to the submirror holding frame 212. Submirror support members 213, 214 are integral with the submirror holding frame 212. The submirror support member 213 is so axially supported on the shaft 206 as to be rotatable about the shaft 206. A pin 215 is fixed to the submirror support member 213. A toggle spring 216 is caught (stretched between) by this pin 215 and the pin 207.

Figure 18:
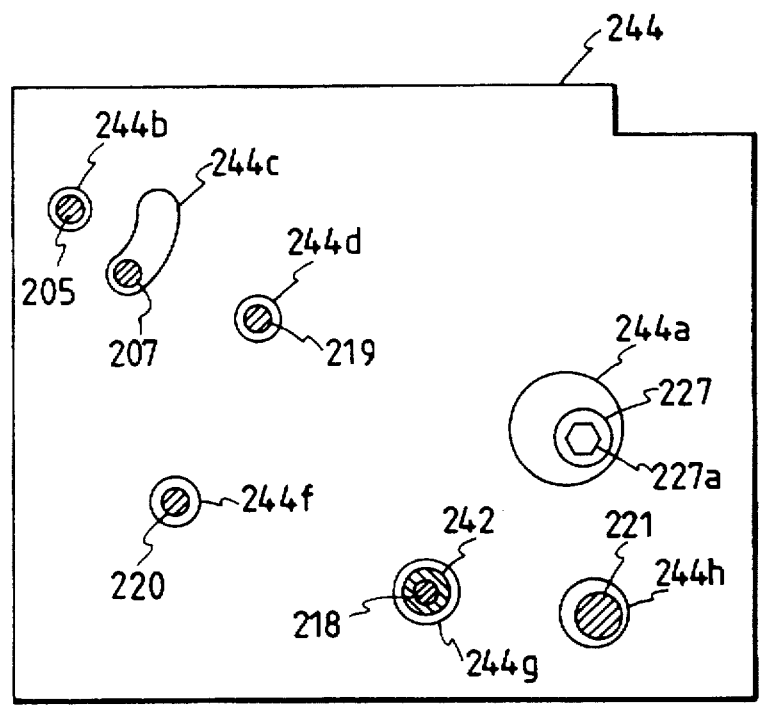
FIG. 18 is a view of a mirror box side wall as viewed from an interior of a mirror box.

The submirror support member 213 is biased counterclockwise by the toggle spring 216. The submirror holding frame 212 is pushed against a pin 220 by the above biasing force. The pin 207, as illustrated in FIG. 18, penetrates a circular arc hole 244c (a fitting hole) cut in the mirror box side wall 244 and a circular arc hole 240a (a fitting hole) formed in the side surface substrate 240. The pin 207 thus protrudes outwardly of the mirror box. The submirror support member 214 is so axially supported on the shaft 209 as to be rotatable about the shaft 209.

A line MM is the central line common to the shafts 206, 209. A shaft 217 is fixed to the side surface substrate 240. Pins 219, 220, as shown in FIG. 18, penetrate holes 244d, 244f cut in the mirror box side wall 244 but are fixed to the side surface substrate 240.

As illustrated in FIG. 18, a shaft 218 (a mirror receiving member) penetrates a hole 244g formed in the mirror box side wall 244 and is, at the same time, rotatably fitted to a bearing 242 fixed to the side surface substrate 240.

As shown in FIG. 18, an eccentric pin 221 (a mirror position adjusting member and a second adjusting member) penetrates a hole 244h formed in the mirror box side wall 244 and is so attached to the side surface substrate 240 as to be rotationally adjustable.

A main mirror receiving member 222 (a mirror receiving member) is fixed (fixedly attached) to one end of the shaft 218. An inertia lever 223 (a mirror receiving member) is fixed (fixedly attached) to the other end of the shaft 218. The main mirror receiving member 222 and the inertia lever 223 therefore make motions together. An arm 222a of the main mirror receiving member 222 contacts an eccentric pin 221. A pin 225 (a mirror receiving member) is fixed (fixedly attached) to the main mirror receiving member 222, and its front edge contacts the main mirror holding frame 202. The inertia lever 223 has a frictional surface 223a assuming a shape of circular arc. A weight 227 (an adjusting member, a moment-of-inertia adjusting member, a moment-of-inertia setting member, a first adjusting member and a mirror receiving member) is so fitted to the inertia lever 223 as to be rotationally adjustable.

The weight 227 is formed of a resinous material (e.g., (Metelon), a registered brand name of Daisei Industry Co., Ltd.) synthesized (mix-formed) by mixing a metal material such as a copper alloy (e.g., phosphor bronze) and a tungsten or a resin (a non-metal material) such as a mold with a metal powder (a metal material). The resinous material such as (Metelon), the copper alloy and tungsten have a large specific gravity, and, therefore, down-sizing of the weight can be attained. As a result, this produces such an effect that down-sizing of the bounce preventing apparatus is also accomplished. Further, the resinous material such as (Metelon) and the copper alloy are low of price, and, hence there is produced an effect to reduce the costs. Besides, the resinous product like (Metelon) has an effect of being easy to mold but hard to produce a rust.

One end of a spring 226 is secured to the front edge of an arm 223b of the inertia lever 223. This weight 227 penetrates a hole 240b (a penetration hole) cut in the side surface substrate 240 and a hole 244a (an adjusting hole) formed in the mirror box side wall 244. Then, a vertex of the weight 227 is exposed (visually recognizable from the inside of the mirror box) from the inside (an arrow B-side) of the mirror box.

Further, the weight 227 is conceived as an eccentric pin including an eccentric shaft 227b. The eccentric shaft 227b is so caulked by the inertia lever 223 as to be rotationally adjustable. As illustrated in FIG. 18, a head 227a (vertex) of the weight 227 is formed with an angular hole (a hexagonal hole and a fitting hole). When this angular hole is rotated by a wrench (a hexagonal wrench and a rotation operating member) or the like, it follows that the weight 227 rotates about the eccentric shaft 227b. With this rotation, a distance between the weight 227 and the shaft 218 varies.

When the distance between this weight 227 and the shaft 218 varies, the moment of inertia of the inertia lever 223 also changes. That is, the moment of inertia of the inertia lever 223 can be adjusted by regulating this distance variation quantity.

A brake lever (a damping member) 228 is so attached to the shaft 217 as to be rotatable about the shaft 217. The brake lever 228 has a contact surface 228a, and a spring 226 is attached to its front edge. The spring 226 (an elastic member, a first elastic member and absorbing member) biases the main mirror receiving member 222 counterclockwise about a bearing 242. The spring 226 also biases the brake lever 228 clockwise about the shaft 217. With this biasing force, the arm 222a is pushed against the eccentric pin 221 (a mirror adjusting member and a second adjusting member); and the contact surface 228a is pushed (collided) against the frictional surface 223a.

One end of a mirror return spring 230 (a return spring and a mirror-down spring) is caught by the front edge of the pin 207. The other end of the spring 230 is caught by a pin 243 fixed to the side surface substrate 240. The main mirror 201 is biased counterclockwise about the shafts 205, 208 by the biasing force of this mirror return spring 230. With the biasing force of this spring 230, the main mirror holding frame 202 is pushed (collided) against the pin 225.

The spring 226 exhibits a stronger biasing force than that of the mirror return spring 230. A drive lever 231 is mounted in the camera body (unillustrated). The pin 210 exists within a kinetic locus (a moving locus and a moving region) of this drive lever 231 and is capable of colliding against the drive lever 231.

Next, the operation of this embodiment will be explained.

After assembling the front body 100 and the rear body 101, the release button (not shown) is depressed. Hereupon, the drive lever 231 moves in a direction G in FIG. 17. Then, the drive lever 231 engages with the pin 210, thereby raising the main mirror 201 (mirror-up). At this time, the main mirror rotates clockwise about the shafts 205, 208, resisting the mirror return spring 230. Eventually, the submirror holding frame 212 and the pin 220 are brought into a non-contact state (the holding frame 212 and the pin 220 are released from the collision). Hereupon, the submirror support member 213 rotates counterclockwise about the shaft 206 by the biasing force of the toggle spring 216. With this rotation, an arm 213a of the submirror support member 213 and the pin 219 come into a contact state (collide with each other).

Further, the biasing force of the toggle spring 216, upon a mirror-up of the main mirror 201, changes in terms of its direction and acts to rotate the submirror support member 213 clockwise about the shaft 206. With this action, an arm 213b of the submirror support member 213 and the pin 19 contact (collide with) each other this time.

Then, the main mirror 201, when completing its rising motion, (mirror-up), comes to contact a stopper fixed to the unillustrated camera body and thus stops. Thereafter, the stop position of the main mirror 201 is termed a photographing position. At this time, the main mirror holding frame 202 contacts the submirror holding frame 212 by the biasing force of the toggle spring 216, with the result that the half-transmission portion 201a is intercepted. Hereafter, the shutter (not shown) operates to expose the film.

After completing the exposure on the film, the drive lever 231 moves in a direction opposite to the direction G in FIG. 17. Following up this motion, the main mirror 201 rotates counterclockwise about the shafts 205, 208 by the biasing force of the mirror return spring 230. The main mirror 201 thus shifts from the photographing position to the viewing position (the mirror-down takes place).

When the main mirror 201 reaches the viewing position, the pin 225 and the main mirror holding frame 202 collide with each other. With this collision, a kinetic energy of the main mirror 201 which acts from the photographing position toward the viewing position is transferred via the pin 225 to the main mirror receiving member 222. The main mirror receiving member 222 rotates clockwise about a bearing 242 because of this collision. At this time, a variation in the light beam S2 which are caused by the bounce after the mirror-down is observed by use of a light metering/focus detecting element 233. Meanwhile, the weight 277 rotates about the eccentric shaft 227b from the arrowed direction B (from the mirror in the mirror box as well as from the interior of the mirror box), and a distance between the weight 227 and the shaft 218 is adjusted so as to minimize the bounce of the main mirror 201 (to minimize the variation in the light beam S2 or so that the variation in the light beam S2 disappears within a short period of time). This distance adjustment implies, i.e., adjusting the moment of inertia of the inertia lever 223.

The kinetic energy obtained by the main mirror receiving member 222 when the main mirror 201 and the pin 225 collide with each other is accumulated as a distortion energy in the spring 226 with rotations of the main mirror receiving member 22. At the same time, the kinetic energy is transformed into a thermal energy by a frictional force between the contact surface 228a and the frictional surface 223a and is then dissipated.

Eventually, the main mirror receiving member 22 stops rotating clockwise. Thereafter, the main mirror receiving member 222 starts rotating counterclockwise by the biasing force of the spring 226. With this rotation, the pin 225 and the main mirror holding frame 202 make a second collision. When the second collision takes place, however, the kinetic energy of the main mirror receiving member 222 has already been dissipated by the friction between the contact surface 228a and the frictional surface 223a when the main mirror receiving member 222 rotates counterclockwise. For this reason, the main mirror 201 makes almost no bounce even when the second collision between the pin 225 and the main mirror holding frame 202 takes place.

As discussed above, according to the present invention, even after assembling the front body and the rear body, the mirror bounce preventing apparatus is constructed so that the moment of inertia of the same apparatus can be adjusted from the interior of the mirror box. Hence, it is possible to obviate the troublesomeness to manually operate the mirror in order to adjust the moment of inertia. At the same time, there is no necessity for providing a special device for performing the mirror-up and mirror-down.

Further, after assembling the front body and the rear body, the moment of inertial of the mirror bounce preventing apparatus is adjustable, and, therefore, it is feasible to adjust the moment of inertia of the mirror bounce preventing apparatus, including the mechanical assembly error, caused when assembling the bodies, between the mirror mechanism of the front body, the mirror-up spring of the rear body and the charge mechanism. Thus, the accurate adjustment based on the actual use is attainable.

It is apparent that, in this invention, a wide range of different working modes can be formed based on the invention without deviating from the spirit and scope of the invention. This invention is not restricted by its specific working modes except being limited by the appended claims.

What is claimed is:

1. An apparatus for preventing mirror bounce in a camera, comprising:

a mirror member rotatable in reciprocation between a viewing position and a photographing position, said mirror member having a first moment of inertia about a rotational axis thereof; and a mirror receiving member to receive a kinetic energy of said mirror member by making a predetermined motion when said mirror member comes into collision with said mirror receiving member, said mirror receiving member having a second moment of inertia about a rotational axis thereof, wherein said mirror receiving member and said mirror member are adapted to equate said first moment of inertia with $e\text{-}C2^2/C1^2$ times said second moment of inertia, where e is a coefficient of restitution at a colliding point of said mirror member with said mirror receiving member, C2 is a distance of a perpendicular on a common normal line at the colliding point of said mirror member with said mirror receiving member from the rotational axis of said mirror member, and C1 is a distance of a perpendicular on a common normal line at the colliding point of said mirror member with said mirror receiving member from the rotational axis of said mirror receiving member.

2. The apparatus for preventing mirror bounce according to claim 1, further comprising an adjusting member externally operable to adjust said second moment of inertia.

3. The apparatus for preventing mirror bounce according to claim 1, wherein said second moment of inertia is set larger than said first moment of inertia when a bounce time of said mirror member after the collision of said mirror member with said mirror receiving member is minimized.

4. The apparatus for preventing mirror bounce according to claim 1, further comprising a damping member to friction-dampen the predetermined motion of said mirror receiving member by coming into contact with said mirror receiving member when said mirror receiving member takes the predetermined motion.

5. The apparatus for preventing mirror bounce according to claim 1, wherein the predetermined motion made by said mirror receiving member is a rotational motion.

6. The apparatus for preventing mirror bounce according to claim 1, wherein said mirror member includes a main mirror and a submirror rotatable relative to said main mirror, and wherein said first moment of inertia includes a third moment of inertia of said main mirror itself about a rotational axis of said main mirror and a fourth moment of inertia of said submirror itself about a rotational axis of said submirror.

7. An apparatus for preventing mirror bounce in a camera, comprising:

a mirror member rotatable in reciprocation between a viewing position and a photographing position;

a mirror receiving member to receive a kinetic energy of said mirror member by making a predetermined motion when said mirror member comes into collision with said mirror receiving member; and an adjusting member externally operable to adjust a moment of inertia of said mirror member.

8. The apparatus for preventing mirror bounce according to claim 7, wherein said adjusting member is a rotatable pin having an eccentric weight.

9. The apparatus for preventing mirror bounce according to claim 8, wherein said pin is a pin for a mirror-up.

10. An apparatus for preventing mirror bounce in a camera, comprising:

a mirror member rotatable in reciprocation between a viewing position and a photographing position;

a mirror receiving member for receiving a kinetic energy of said mirror member by making a predetermined motion when said mirror member comes into collision with said mirror receiving member;

a weight, provided integrally with said mirror receiving member, for receiving the kinetic energy of said mirror member together with said mirror receiving member, wherein a moment of inertia of said mirror receiving member is adjustable by adjusting a position or a mass of said weight; and a damping member for damping said mirror receiving member when said mirror receiving member makes the predetermined motion.

11. The apparatus for preventing mirror bounce according to claim 10, wherein the moment of inertia of at least one of said mirror receiving member, integral with said weight, and said mirror member is set so that a bounce time after the collision of said mirror member is shorter by at least 15% than a bounce time when said mirror receiving member is fixed.

12. The apparatus for preventing mirror bounce according to claim 10, further comprising an adjusting member externally operable and capable of adjusting the moment of inertia of said mirror receiving member in accordance with this operation.

13. The apparatus for preventing mirror bounce according to claim 10, wherein the moment of inertia of said mirror receiving member is set larger than the moment of inertia of said mirror receiving member when the bounce time is minimized.

14. The apparatus for preventing mirror bounce according to claim 10, wherein said damping member friction-dampens the predetermined motion of said mirror receiving member by coming into contact with said mirror receiving member when said mirror receiving member makes the predetermined motion.

15. The apparatus for preventing mirror bounce according to claim 10, wherein said weight includes a plurality of detachable and attachable weight members, and wherein the mass of said weight is adjustable by detaching or attaching said weight members.

16. The apparatus for preventing mirror bounce according to claim 10, wherein said weight is an eccentric pin having an eccentric shaft, said eccentric pin being rotatable about said eccentric shaft.

17. An apparatus for preventing mirror bounce in a camera comprising:

a mirror member rotatable in reciprocation between a viewing position and a photographing position;

a mirror receiving member to receive a kinetic energy of said mirror member by making a predetermined motion when said mirror member comes into collision with said mirror receiving member; and a damping member to dampen said mirror receiving member when said mirror receiving member makes the predetermined motion, wherein collided portions between said mirror member and said mirror receiving member respectively take a configuration of an involute curve or a configuration approximate to the involute curve.

18. The apparatus for preventing mirror bounce according to claim 17, wherein said mirror member and said mirror receiving member are rotatable about their rotary shafts, and wherein the collided portions respectively take toothed shapes of involute gears rotating their rotary shafts and respectively rotatable by an engagement of the two toothed shapes.

19. The apparatus for preventing mirror bounce according to claim 17, wherein the collided portions respectively take circular arc shapes approximate to the involute curve.

20. The apparatus for preventing mirror bounce according to claim 17, the collided portions respectively take polygonal line shapes approximate to the involute curve.

21. The apparatus for preventing mirror bounce according to claim 17, wherein the predetermined motion made by said mirror receiving member is a rotary motion.

22. The apparatus for preventing mirror bounce according to claim 17, further comprising a damping member to friction-dampen the predetermined motion of said mirror receiving member by coming into contact with said mirror receiving member when said mirror receiving member makes the predetermined motion.

23. An apparatus for preventing mirror bounce in a camera, comprising:

a mirror box;

a mirror member provided in said mirror box and shiftable between a viewing position within a photographing optical path and a photographing position off the photographing optical path;

a mirror receiving member to receive a kinetic energy of said mirror member by making a predetermined motion when said mirror member comes into collision with said mirror receiving member, said mirror receiving member provided as to be rotatable about a predetermined central shaft of rotation, and said mirror receiving member colliding with said mirror member in the viewing position for receiving a kinetic energy of said mirror member when said mirror member shifts from the photographing position to the viewing position;

a damping member to dampen said mirror receiving member when said mirror receiving member makes the predetermined motion; and an adjusting member to adjust a moment of inertia of said mirror receiving member with respect to the predetermined central shaft of rotation and so disposed as to be capable of adjustment from an inside of said mirror box.

24. The apparatus for preventing mirror bounce according to claim 23, wherein said adjusting member is integral with said mirror receiving member.

25. The apparatus for preventing mirror bounce according to claim 23, wherein said adjusting member is an eccentric pin having a weight and the moment of inertia is adjusted by adjusting a positional relationship between the central shaft of rotation and the weight of said eccentric pin.

26. The apparatus for preventing mirror bounce according to claim 23, wherein said adjusting member is composed of a metal material.

27. The apparatus for preventing mirror bounce according to claim 26, wherein the metal material is a copper alloy or tungsten or a tungsten sintered alloy.

28. The apparatus for preventing mirror bounce according to claim 23, wherein said adjusting member is a mix molding of a non-metal material and a metal material.

29. The apparatus for preventing mirror bounce according to claim 23, wherein one side wall of said mirror box is formed with an adjusting hole for making said adjusting member adjustable.

30. The apparatus for preventing mirror bounce according to claim 29, further comprising a substrate having a penetration hole penetrable by said adjusting member and fixedly provided on said one side wall on the side opposite to said mirror member.

31. The apparatus for preventing mirror bounce according to claim 23, wherein said damping member friction-dampens the operation of said mirror receiving member by coming into contact with said mirror receiving member when said mirror receiving member operates.

\* \* \* \* \*